US012330182B2

(12) United States Patent
Yuan et al.

(10) Patent No.: US 12,330,182 B2
(45) Date of Patent: Jun. 17, 2025

(54) SELF-WINDING HOSE REELS FOR PRESSURE WASHERS

(71) Applicant: Duro Industries, LLC, Dover, DE (US)

(72) Inventors: Yue Yuan, Dover, DE (US); Haiquan Wang, Qingdao (CN)

(73) Assignee: Duro Industries, LLC, Dover, DE (US)

( * ) Notice: Subject to any disclaimer, the term of this patent is extended or adjusted under 35 U.S.C. 154(b) by 0 days.

(21) Appl. No.: 18/882,801

(22) Filed: Sep. 12, 2024

(65) Prior Publication Data

US 2025/0083162 A1 Mar. 13, 2025

Related U.S. Application Data

(63) Continuation-in-part of application No. 18/367,680, filed on Sep. 13, 2023.

(51) Int. Cl.
*B05B 9/04* (2006.01)
*B05B 7/04* (2006.01)
(Continued)

(52) U.S. Cl.
CPC ............ *B05B 9/0426* (2013.01); *B05B 9/007* (2013.01); *B08B 3/026* (2013.01); *B65H 75/42* (2013.01);
(Continued)

(58) Field of Classification Search
CPC ......... B05B 1/24; B05B 7/0408; B05B 9/007; B05B 9/0426; B05B 15/60; B05B 9/04; B05B 9/0403; B08B 3/026; B08B 2203/027; B08B 2203/0276; B08B 3/028; B65H 75/40; B65H 75/403; B65H 75/42; B65H 75/425; B65H 2701/33; F02B 63/047; F02B 63/06; F02B 2063/045; F04B 17/05; F04B 17/06; Y10T 137/6899; Y10T 137/6918–6962
(Continued)

(56) References Cited

U.S. PATENT DOCUMENTS 4,135,669 A * 1/1979 Bridges .................. B05B 9/007 239/391
4,238,074 A 12/1980 Coons
(Continued)

FOREIGN PATENT DOCUMENTS

BR MU90014812 U2 12/2012
WO 2019206395 A1 10/2019

*Primary Examiner* — Kenneth Rinehart
*Assistant Examiner* — Jonathan J Waddy
(74) *Attorney, Agent, or Firm* — Georgiy L. Khayet

(57) ABSTRACT

An assembly for high-pressure cleaning and a method for manufacturing an assembly for high-pressure cleaning are provided. The assembly includes a pressure washer, a handle, and a self-winding hose reel. The pressure washer includes a platform, an engine mounted onto the platform, and a water pump coupled to the engine. The handle is configured to be used for maneuvering the platform. The handle is mounted onto the platform. The self-winding hose reel is coupled to the pressure washer. The handle is configured to rotate with respect to the engine from a first position to a second position. The self-winding hose reel may be mounted onto the handle or under the platform.

14 Claims, 14 Drawing Sheets

(51) Int. Cl.
*B05B 9/00* (2006.01)
*B08B 3/02* (2006.01)
*B65H 75/42* (2006.01)

(52) U.S. Cl.
CPC ..... *B05B 7/0408* (2013.01); *B08B 2203/0276* (2013.01); *B65H 2701/33* (2013.01); *Y10T 137/6958* (2015.04)

(58) Field of Classification Search
USPC ........................... 137/355.12, 355.16–355.28
See application file for complete search history.

(56) References Cited

U.S. PATENT DOCUMENTS 4,700,422 A * 10/1987 Russell ................... B08B 9/045 134/168 C
4,700,737 A 10/1987 Nelson
4,773,113 A * 9/1988 Russell ................... E03F 9/005 15/4
5,419,497 A * 5/1995 Warrington ............ A62C 27/00 239/722
5,653,584 A * 8/1997 Mazzucato ............. F04B 53/00 417/364
5,980,220 A * 11/1999 Mazzucato ............. F04B 1/148 417/364
6,761,135 B1 7/2004 Becktold
6,935,642 B1 * 8/2005 Craig ...................... F04B 17/06 280/47.24
8,398,097 B2 * 3/2013 Junk ....................... B08B 3/026 417/364
8,915,231 B2 * 12/2014 Raasch ................... F02D 31/00 123/363
10,888,887 B2 1/2021 Masters
D932,717 S * 10/2021 Xu ................................ D32/15
2009/0272412 A1 11/2009 Steinhauser et al.
2011/0253229 A1 * 10/2011 Mattson ................ B05B 7/0093 137/355.16
2012/0018534 A1 * 1/2012 Gilpatrick ............. B05B 7/0876 239/310
2012/0241537 A1 * 9/2012 Schwei ................... B05B 9/007 239/147
2014/0119949 A1 * 5/2014 Wischstadt ............. F04B 17/05 417/34
2015/0102121 A1 * 4/2015 Dey .......................... B05B 9/01 239/69
2016/0167869 A1 * 6/2016 Gilpatrick ............... F04B 53/18 222/251
2017/0304873 A1 10/2017 Luby et al.
2018/0021800 A1 * 1/2018 Janik ....................... B05B 15/62 239/146
2018/0133729 A1 * 5/2018 Masters .............. A47L 11/4091
2020/0001313 A1 * 1/2020 Bindl .................... B05B 12/006
2020/0023399 A1 * 1/2020 Gordon ................... B05B 9/007
2020/0171522 A1 6/2020 Sugiura
2022/0339655 A1 * 10/2022 Wuerfl .................. B05B 9/0861
2024/0240442 A1 * 7/2024 Sphar ...................... E03C 1/302

* cited by examiner

SELF-WINDING HOSE REELS FOR PRESSURE WASHERS

CROSS-REFERENCE TO RELATED APPLICATIONS

This application is a Continuation-in-Part of, and claims the priority benefit of, U.S. patent application Ser. No. 18/367,680, filed on Sep. 13, 2023, and entitled "SELF-WINDING HOSE REELS FOR PRESSURE WASHERS." The subject matter of the aforementioned application is incorporated herein by reference in its entirety.

TECHNICAL FIELD

This disclosure relates to pressure washers. More specifically, this disclosure relates to self-winding hose reels for pressure washers.

BACKGROUND

Pressure washers are machines that propel pressurized water to clean various surfaces, effectively removing dirt, grime, and contaminants. Components of a typical pressure washer include an engine as a power source for driving the pressure washer, a pump for pressurizing water, a frame for providing structural support and protection for the components, a spray nozzle for controlling the shape and intensity of the water stream, and a high-pressure water hose that connects the pump outlet to the spray nozzle. Additional components may be included depending on the specific model and type of pressure washer.

The high-pressure water hose is a conduit that delivers pressurized water from the pump to the spray nozzle. In conventional pressure washers, these hoses are often left loose, hanging on the side or in the middle of handles of the pressure washers. Users need to manually wrap and unwrap the high-pressure water hose, which can be challenging due to the high stiffness of the high-pressure water hose.

Some conventional pressure washers are equipped with a manual hose reel connected to a frame of the pressure washer for more convenient storage and management of the high-pressure water hose when not in use. However, operating these manual hose reels requires physical effort, as the user needs to manually crank a handle to wind or unwind the high-pressure water hose. This can be particularly tiresome if the high-pressure water hose is long and heavy.

Additionally, close attention should be given to mutual positioning of the components on the pressure washers. Specifically, the positioning of hose reels, especially when placed too high on the frame of the pressure washer and pulled too hard, can lead to stability issues. Elevated hose reels may cause tipping over of the pressure washer during operation or when unwinding the hose reels, posing a safety hazard and reducing the overall usability of the pressure washer.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

According to an example embodiment of the present disclosure, an assembly for high-pressure cleaning is provided. The assembly may include a pressure washer, a handle, and a self-winding hose reel. The pressure washer may include a platform, an engine mounted onto the platform, and a water pump coupled to the engine. The handle may be configured to be used for maneuvering the platform. The handle may be mounted onto the platform. The self-winding hose reel may be coupled to the pressure washer.

According to another embodiment of the present disclosure, a method for manufacturing an assembly for high-pressure cleaning is provided. The method may commence with providing a pressure washer. The pressure washer may include a platform, an engine mounted onto the platform, and a water pump coupled to the engine. The method may further include providing a handle. The handle may be configured to be used for maneuvering the platform. The handle may be mounted onto the platform. The method may proceed with providing a self-winding hose reel. The self-winding hose reel may be coupled to the pressure washer.

Other example embodiments of the disclosure and aspects will become apparent from the following description taken in conjunction with the following drawings.

BRIEF DESCRIPTION OF THE DRAWINGS

Exemplary embodiments are illustrated by way of example and not limitation in the figures of the accompanying drawings, in which like references indicate similar elements.

DETAILED DESCRIPTION

Figure 1:
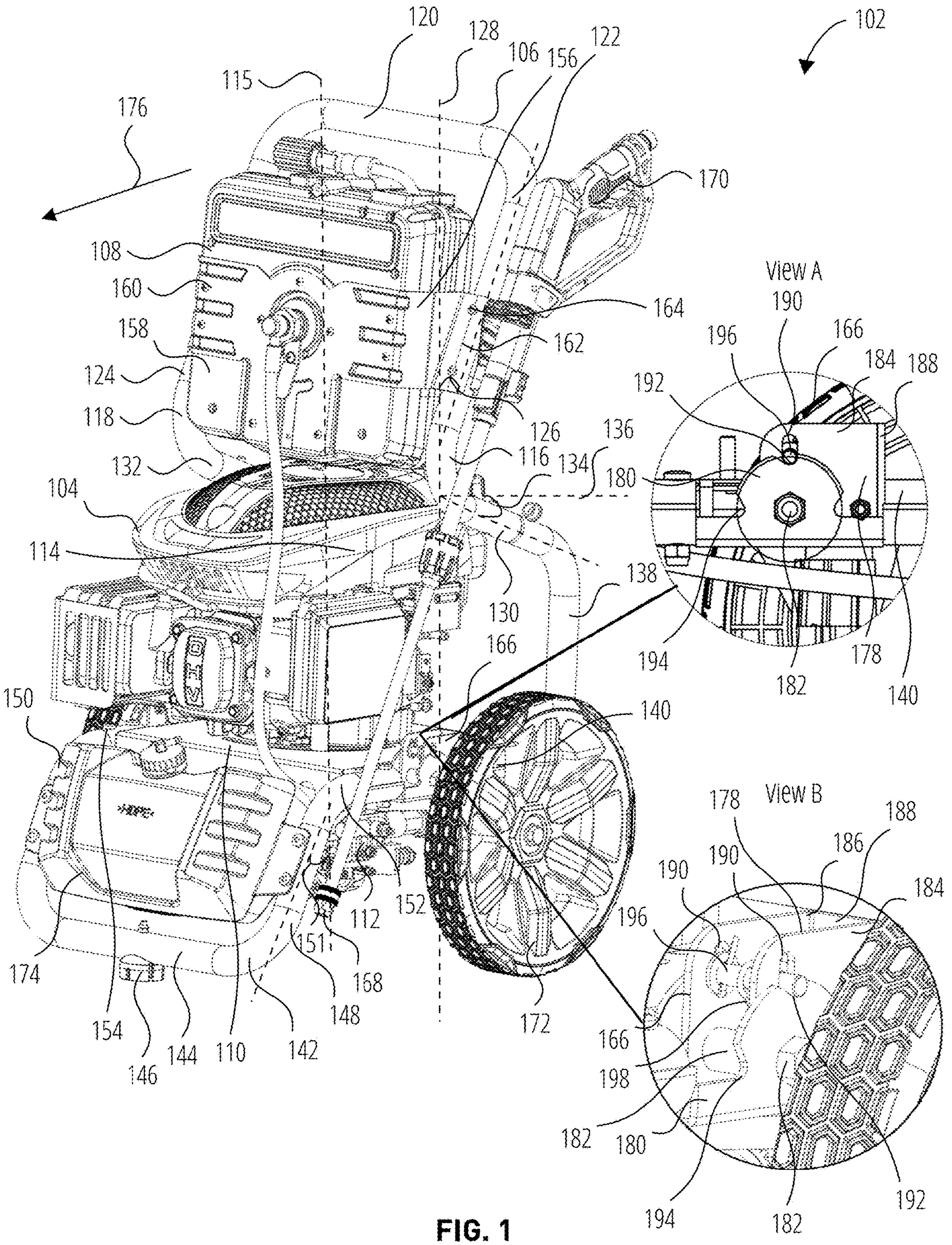
FIG. 1 is a front perspective view of an assembly for high-pressure cleaning with a handle in a first position and powered by a vertical shaft engine, according to an example embodiment.

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and operational changes can be made without departing from the scope of what is claimed. The following detailed description is, therefore, not to be taken in a limiting sense, and the scope is defined by the appended claims and their equivalents.

Generally, the embodiments of this disclosure relate to assemblies for high-pressure cleaning. An assembly for high-pressure cleaning may include a pressure washer, a handle connected to the pressure washer, and a self-winding hose reel coupled to the pressure washer. The pressure washer may include a platform, an engine mounted onto the platform, and a water pump coupled to the engine. The handle may be mounted onto the platform and may be used for maneuvering the platform. In some example embodiments, the self-winding hose reel may be mounted on the handle. In some example embodiments, the self-winding hose reel may be mounted under the platform.

The self-winding hose reel may include a water hose, a drum onto which the water hose is wound, a spring disposed in the drum, and a housing for accommodating the components of the self-winding hose reel. The spring may actuate the rotation of the drum and allow the water hose to be automatically wound up inside the housing of the self-winding hose reel after use.

The pressure washer may include any type of pressure washer available on the market. In example embodiments, the pressure washer may include a pressure washer powered by a vertical shaft engine. In some example embodiments, the pressure washer may include a pressure washer powered by a horizontal shaft engine. The present disclosure provides several example embodiments for attaching the self-winding hose reel to these types of pressure washers.

In the vertical shaft engine powered pressure washer, a pump (also referred herein to as a water pump) may be installed under a vertical shaft engine, i.e., at the bottom of the pressure washer. For this type of pressure washer, the self-winding hose reel may be configured to be rotated with respect to the vertical shaft engine. Specifically, the self-winding hose reel may be attached by a latching mechanism to a handle of the pressure washer. The handle may be a part of a frame of the pressure washer. The handle may be configured to rotate between a vertical position and a horizontal position. Since the self-winding hose reel is attached to the handle, rotating the handle causes the self-winding hose reel to rotate between the vertical position and the horizontal position. Specifically, the handle with the self-winding hose reel on it may be folded down into the horizontal position during the operation of the pressure washer and may be folded up into the vertical position when access to a fuel tank or other elements of the pressure washer is needed or when the pressure washer is not currently in use.

In the horizontal shaft engine powered pressure washer, the pump may be installed beside a horizontal shaft engine. The horizontal shaft engine powered pressure washer may have wheels (typically smaller than the ones in vertical shaft engine powered pressure washers) on the front side of the pressure washer and a horizontal type handle that extends horizontally. For this type of pressure washer, the self-winding hose reel may be arranged under the horizontal shaft engine, i.e., at the bottom of the pressure washer, and may be attached to a frame of the pressure washer.

Referring now to the drawings, various embodiments are described in which like reference numerals represent like parts and assemblies throughout the several views. It should be noted that the reference to various embodiments does not limit the scope of the claims attached hereto. Additionally, any examples outlined in this specification are not intended to be limiting and merely set forth some of the many possible embodiments for the appended claims.

FIGS. 1-6 illustrate an assembly for high-pressure cleaning in form of a pressure washer powered by an engine, according to an example embodiment. Specifically, FIGS. 1-6 illustrate the pressure washer powered by a vertical shaft engine. FIG. 1 is a front perspective view of an assembly for high-pressure cleaning shown as an assembly 102, according to an example embodiment. The assembly 102 is a vertical type handle assembly 102, i.e., the assembly 102 has a handle extending vertically. The assembly 102 may include a pressure washer 104, a handle 106 connected to the pressure washer 104, and a self-winding hose reel 108 mounted onto the handle 106. The pressure washer 104 may include a platform 110, vertical shaft engine 114, and a water pump 112 coupled to the vertical shaft engine 114. The handle 106 may be mounted onto the platform 110. The handle 106 may be configured to be used for maneuvering the platform 110. The engine may include one of the following: an electric engine and a gasoline engine. The pressure washer 104 may include one of the following: an electrically powered high-pressure washer, a gasoline engine powered high-pressure washer, and any other type of pressure washer.

As shown in FIGS. 1-6, the assembly 102 may include the pressure washer 104 powered by the vertical shaft engine 114. Therefore, the assembly 102 is a vertical shaft engine powered pressure washer with the self-winding hose reel 108. The water pump 112 may be located under the vertical shaft engine 114. For example, the water pump 112 may be arranged on an axis 115 of a shaft of the vertical shaft engine 114. In an example embodiment, the vertical shaft engine 114 may be secured to an upper surface of the platform 110 using, for example, three bolts and nuts, and the same three bolts and nuts may be used to secure the water pump 112 to a bottom surface of the platform 110 and under the vertical shaft engine 114. The platform 110 may be located between the vertical shaft engine 114 and the water pump 112. In the example embodiment shown in FIG. 1, the self-winding hose reel 108 may be secured above the vertical shaft engine 114 when the assembly 102 is not in use.

The handle 106 may be configured to be rotated with respect to the vertical shaft engine 114 from a first position to a second position. FIGS. 1-3, 4A, and 4B show the handle 106 in the first position. While the handle 106 is in the first position, the self-winding hose reel 108 may be disposed vertically with respect to the vertical shaft engine 114.

Moreover, while the handle 106 is in the first position, the self-winding hose reel 108 may be disposed above the vertical shaft engine 114.

The handle 106 may have a curvilinear form and include several parts. In an example embodiment, the handle 106 may include a first side pipe 116 and a second side pipe 118. In some example embodiments, the second side pipe 118 may be parallel to the first side pipe 116. The self-winding hose reel 108 may be secured between the first side pipe 116 and the second side pipe 118.

The handle 106 may include a holding part 120. The holding part 120 may be disposed horizontally. The holding part 120 may be used by a user of the assembly 102 for holding the handle 106 by hands when maneuvering the assembly 102 by the user. The holding part 120 may connect the first side pipe 116 and the second side pipe 118 to each other.

Each of the first side pipe 116 and the second side pipe 118 may include several parts connected to each other. Specifically, the handle 106 may further include a first pair of inclined parts, namely a first inclined part 122 and a second inclined part 124. The first inclined part 122 may connect, by its first end, to a first end of the holding part 120. The second inclined part 124 may connect, by its first end, to a second end of the holding part 120. When the handle 106 is in the first position, the first inclined part 122 and the second inclined part 124 may be disposed inclined for a first predetermined angle 126 from a vertical axis 128.

The handle 106 may further include a second pair of inclined parts, namely a third inclined part 130 and a fourth inclined part 132. The third inclined part 130 may connect, by its first end, to the second end of the first inclined part 122. The fourth inclined part 132 may connect, by its first end, to the second end of the second inclined part 124. When the handle 106 is in the first position, the third inclined part 130 and the fourth inclined part 132 may be disposed inclined for a second predetermined angle 134 from a horizontal axis 136.

Figure 2:
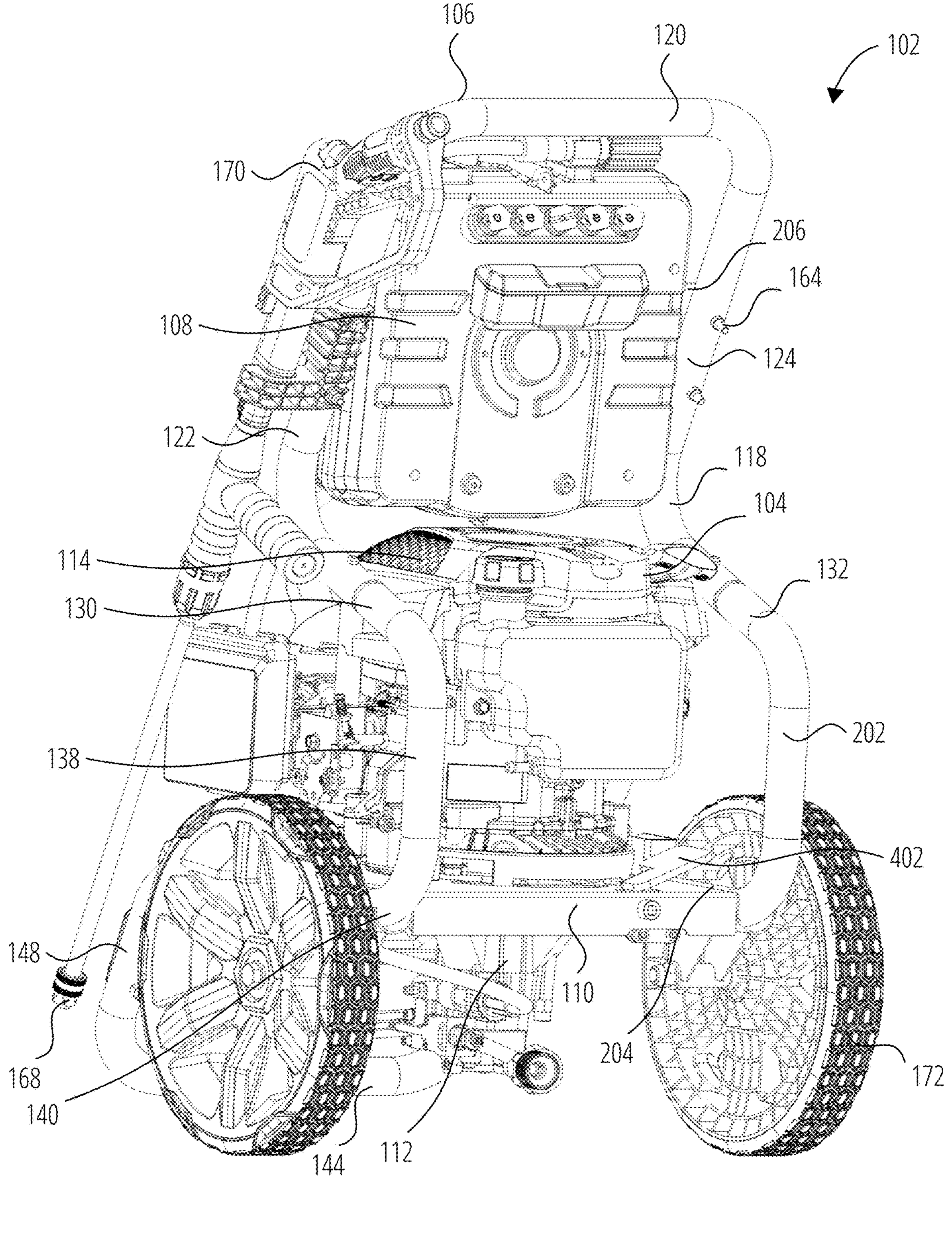
FIG. 2 is a rear perspective view of the assembly for high-pressure cleaning, according to an example embodiment.
Figure 3:
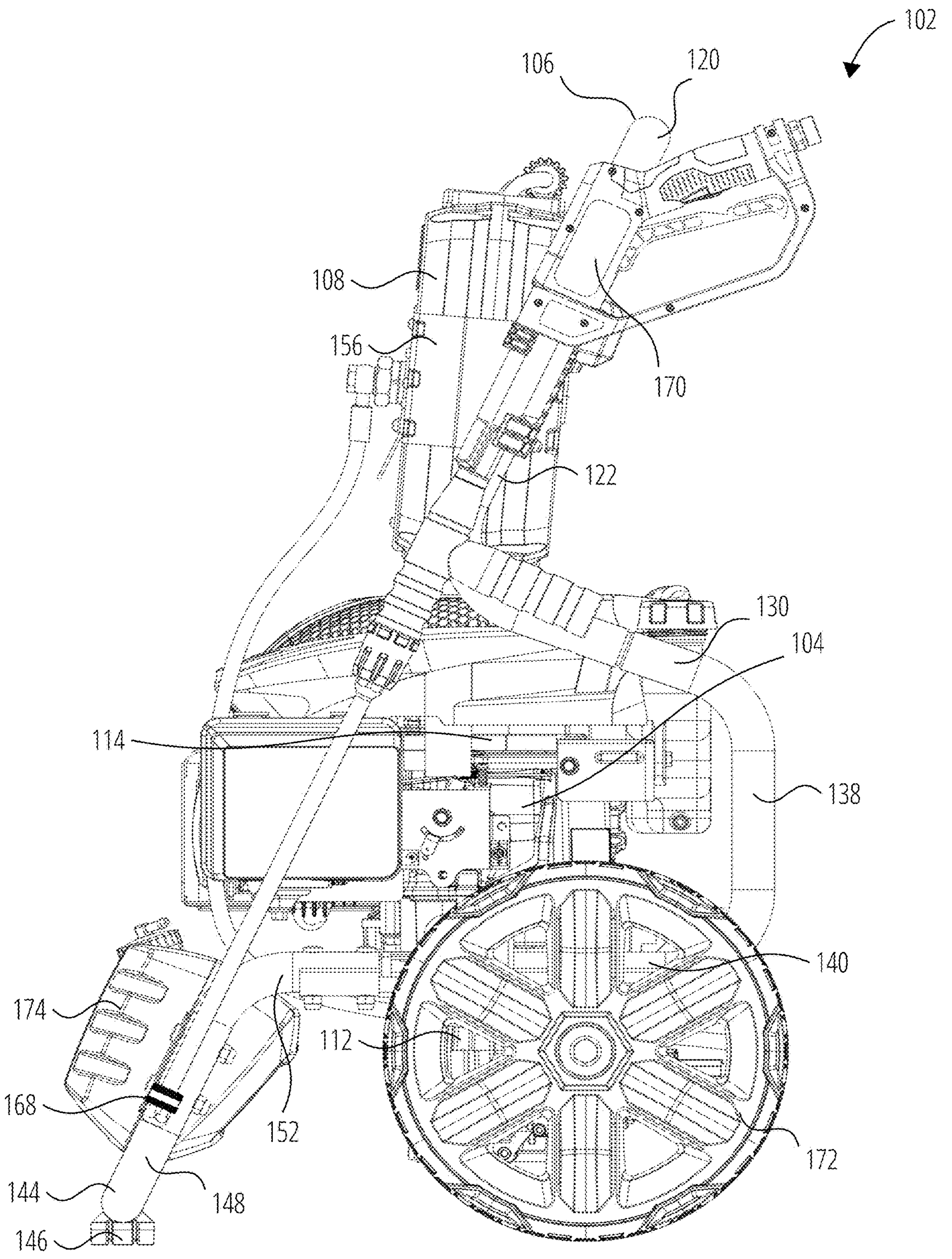
FIG. 3 is a right side view of the assembly for high-pressure cleaning, according to an example embodiment.
Figure 4A:
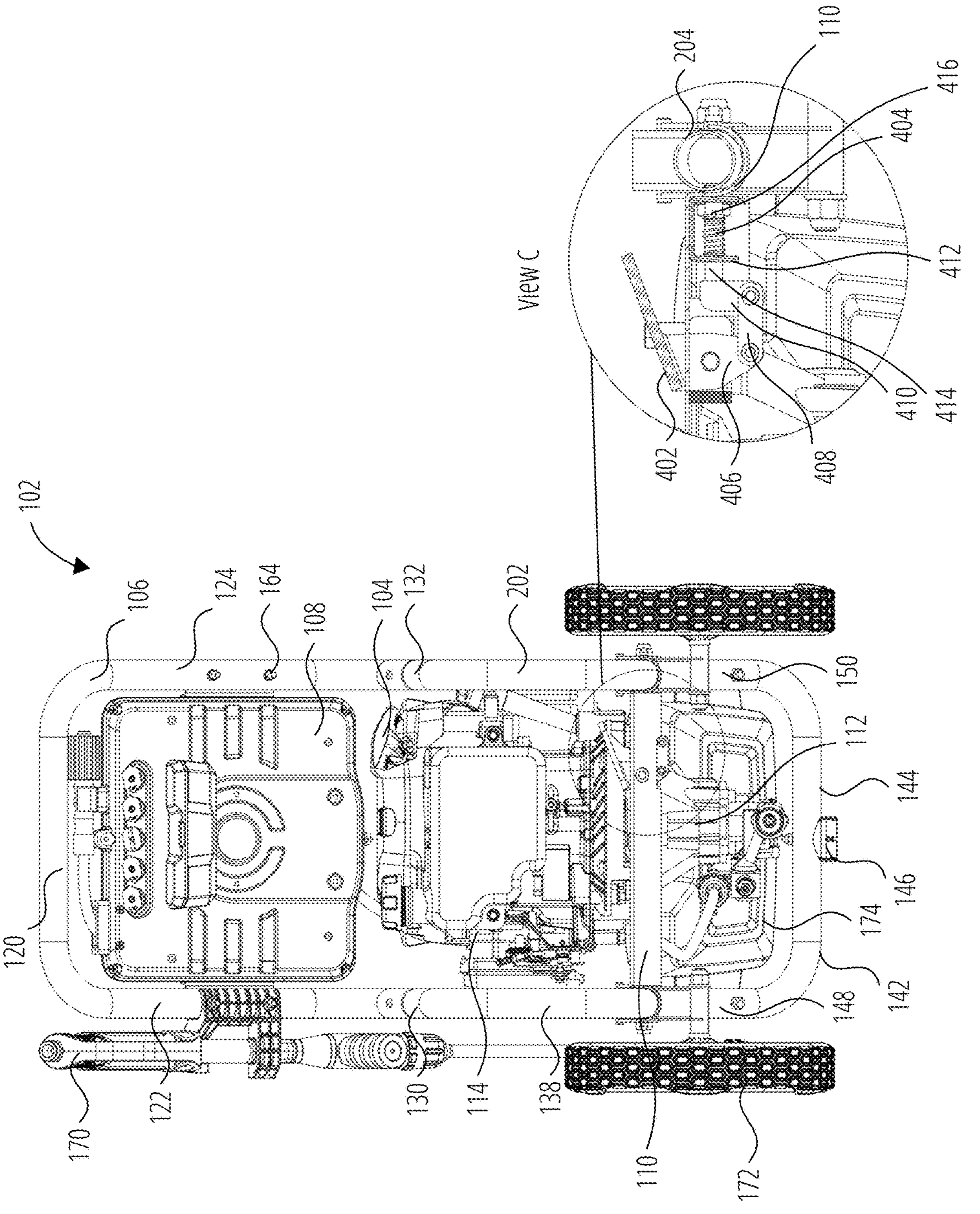
FIG. 4A is a rear view of the assembly for high-pressure cleaning showing in detail a pedal, according to an example embodiment.
Figure 4B:
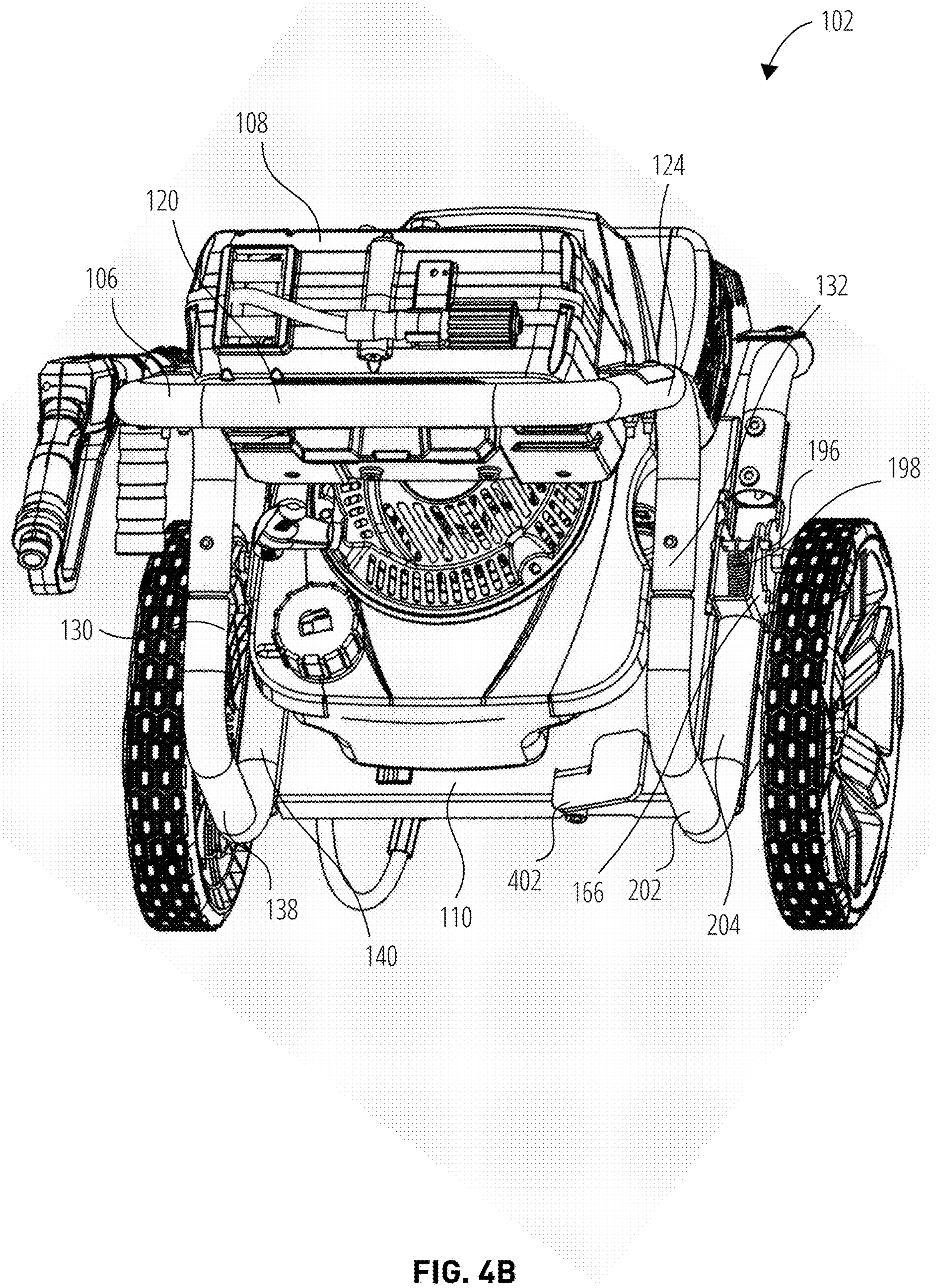
FIG. 4B is a top perspective view of the assembly for high-pressure cleaning showing a pedal, according to an example embodiment.

FIG. 2 is a rear perspective view of the assembly 102, according to an example embodiment. FIG. 3 is a right side view of the assembly 102, according to an example embodiment. FIG. 4A is a rear view of the assembly 102 showing in detail a pedal, according to an example embodiment. FIG. 4B is a top perspective view of the assembly for high-pressure cleaning showing a pedal, according to an example embodiment. As shown in FIGS. 1-3, 4A, and 4B, the handle 106 may further include a pair of support parts, namely a first support part 138 and a second support part 202 shown in FIG. 2. The first support part 138 may connect, by its first end, to the second end of the third inclined part 130. Similarly, the second support part 202 may connect, by its first end, to the second end of the fourth inclined part 132. When the handle 106 is in the first position, the first support part 138 and the second support part 202 may be disposed in a substantially vertical position.

The handle 106 may further include a pair of connecting parts, namely a first connecting part 140 and a second connecting part 204 shown in FIG. 2. The first connecting part 140 may connect, by its first end, to a second end of the first support part 138. Similarly, the second connecting part 204 may connect, by its first end, to a second end of the second support part 202. When the handle 106 is in the first position, the first connecting part 140 and the second connecting part 204 may be disposed in a substantially horizontal position.

Accordingly, the first side pipe 116 may include the first inclined part 122, the third inclined part 130, the first support part 138, and the first connecting part 140 connected to each other. Similarly, the second side pipe 118 may include the second inclined part 124, the fourth inclined part 132, the second support part 202, and the second connecting part 204 connected to each other.

The pressure washer 104 may further have a bottom support 142. The bottom support 142 may include a resting part 144. The resting part 144 may have a stop 146 located in the middle of the resting part 144. The stop 146 may contact a ground surface when the assembly 102 is not maneuvering.

The bottom support 142 may further include a pair of inclined parts, namely a fifth inclined part 148 and a sixth inclined part 150. The fifth inclined part 148 may connect, by its first end, to a first end of the resting part 144. Similarly, the sixth inclined part 150 may connect, by its first end, to a second end of the resting part 144. The fifth inclined part 148 and the sixth inclined part 150 may be disposed inclined for a third predetermined angle 151 from the vertical axis. In an example embodiment, the third predetermined angle 151 of inclination of the fifth inclined part 148 and the sixth inclined part 150 may be substantially equal to the first predetermined angle 126 of inclination of the first inclined part 122 and the second inclined part 124.

The bottom support 142 may further include a pair of connecting parts, namely a third connecting part 152 and a fourth connecting part 154. The third connecting part 152 may connect, by its first end, to the second end of the fifth inclined part 148. Similarly, the fourth connecting part 154 may connect, by its first end, to a second end of the sixth inclined part 150. The third connecting part 152 and the fourth connecting part 154 may be disposed substantially horizontally.

The handle 106 and the bottom support 142 may form a frame of the pressure washer 104. The frame may provide structural support and protection for the components of the pressure washer 104. The handle 106 may be rotatable, and the bottom support 142 may remain in the same position both when the handle 106 is in the first position and when the handle 106 is in the second position.

The self-winding hose reel 108 may be secured to the handle 106 via a fastening plate 156. The fastening plate 156 may be a plate having a curvilinear form. The fastening plate 156 may be connected to a first surface 158 of the self-winding hose reel 108 via fastening elements 160, such as screws. The fastening plate 156 may also be connected by its first end 162 to the first inclined part 122 of the handle 106. The fastening plate 156 may further be connected by its second end 206 (shown in FIG. 2) to the second inclined part 124 of the handle 106. The fastening plate 156 may be connected to the handle 106 via fastening elements 164, such as screws. Accordingly, the fastening plate 156 may secure the self-winding hose reel 108 between the first side pipe 116 and the second side pipe 118 of the handle 106.

The assembly 102 may further include a latching mechanism 166 configured to latch the handle 106 to the platform 110 in the first position and latch the handle 106 to the platform 110 in the second position. The latching mechanism 166 may enable rotating the handle 106 between the first position and the second position. The latching mechanism 166 may be connected to the platform 110.

View A and view B shown in FIG. 1 illustrate in detail the latching mechanism 166. In an example embodiment, the latching mechanism 166 may be located on each side pipe of the handle 106. Accordingly, the latching mechanism 166 may consist of two latching mechanisms, one on the first side pipe 116 and one on the second side pipe 118 of the handle 106. The first latching mechanism 166 may be connected, by its first end, to a second end of the first connecting part 140. The second latching mechanism 166 may be connected, by its first end, to a second end of the second connecting part 204. The latching mechanism 166 may be further connected to the platform 110. Accordingly, the first latching mechanism 166 may be connected to the handle 106 and the platform 110.

In some example embodiments, the assembly 102 may have one latching mechanism 166 disposed on one of the side pipes of the handle 106.

The latching mechanism 166 may enable rotation of the self-winding hose reel 108 connected between the first side pipe 116 and the second side pipe 118 of the handle 106 with respect to the vertical shaft engine 114 and the water pump 112. Specifically, the latching mechanism 166 may be configured to enable the self-winding hose reel 108 to rotate, along with the rotation of the handle 106, between the first position, which is a substantially vertical position of the self-winding hose reel 108 and the handle 106, and the second position, which is a substantially horizontal position of the self-winding hose reel 108 and the handle 106. FIG. 1 shows the assembly 102 with the self-winding hose reel 108 in the first position, in which the self-winding hose reel 108 is disposed substantially vertically. The self-winding hose reel 108 may be folded up into the vertical position when the assembly 102 is not in use, or when access to components located below the self-winding hose reel 108 is needed.

The assembly 102 may have other components required for the operation of the assembly 102, such as a spray nozzle 168 configured to control the shape and intensity of the water stream, a trigger gun 170 for activating the flow of pressurized water from the water pump 112 to the spray nozzle 168, wheels 172 for easy maneuverability and transportation, a soap tank 174, and so forth.

Figure 5:
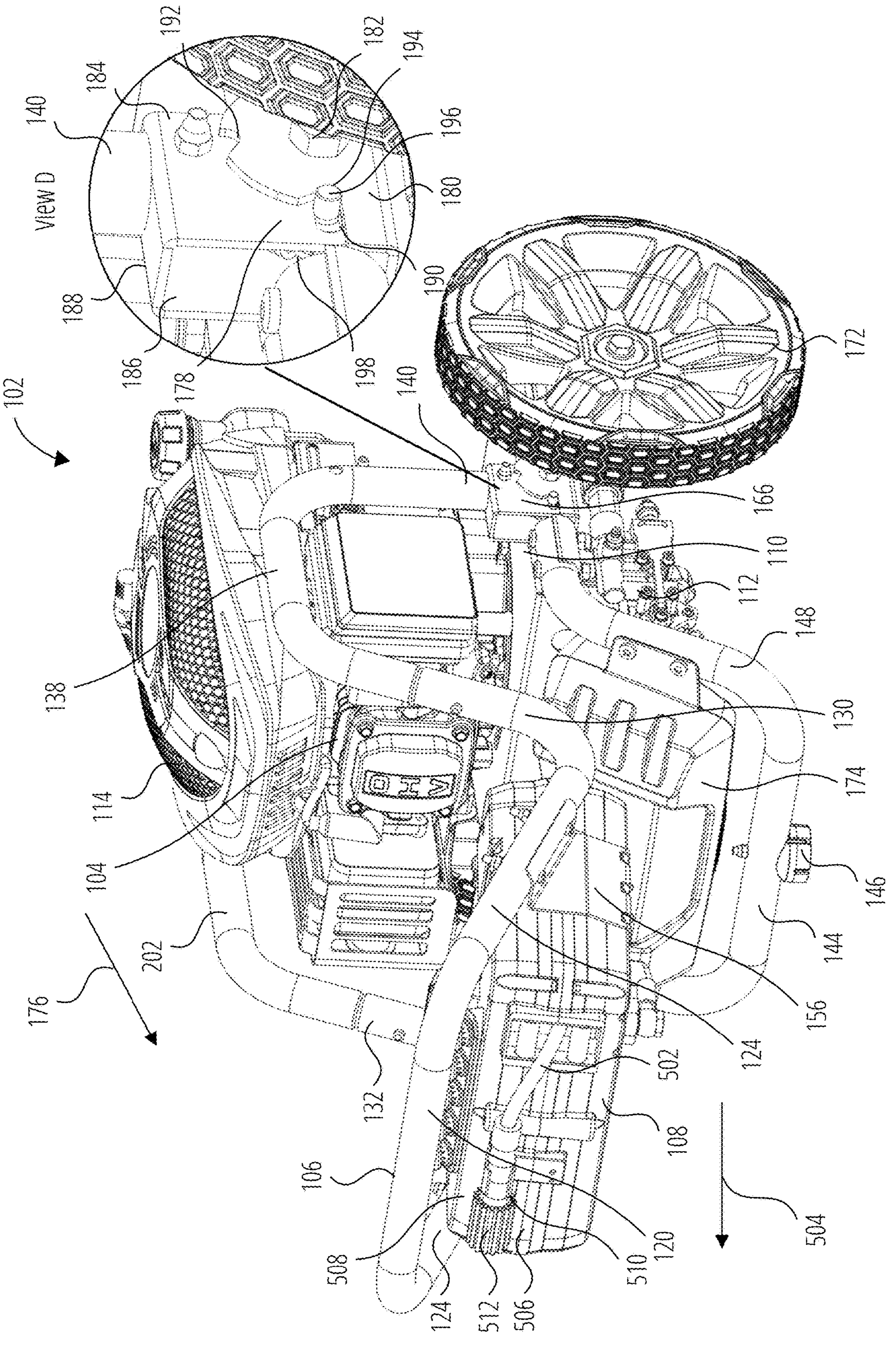
FIG. 5 is a front perspective view of the assembly for high-pressure cleaning with the handle in a second position, according to an example embodiment.
Figure 6:
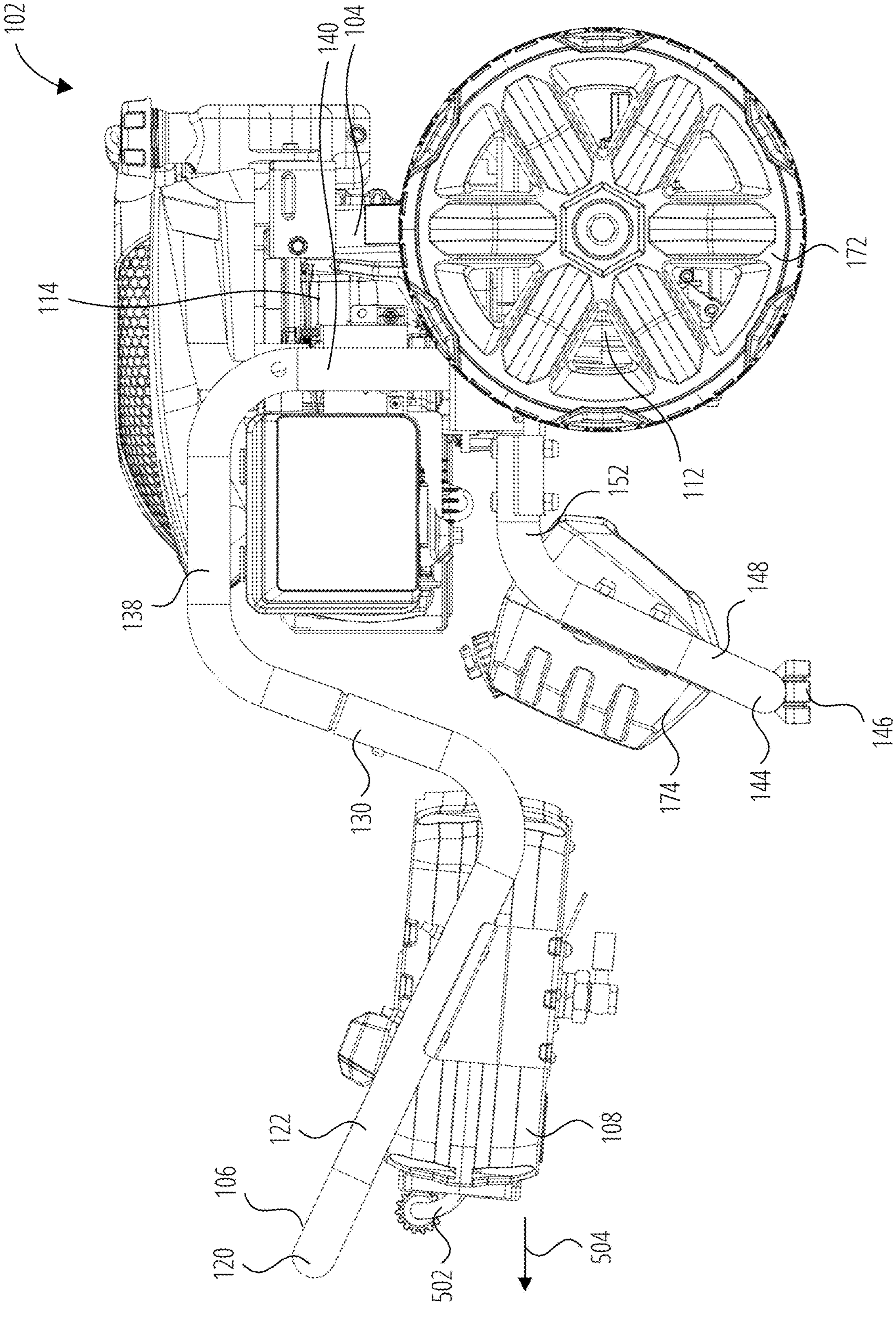
FIG. 6 is a right side view of the assembly for high-pressure cleaning with the handle in the second position, according to an example embodiment.

FIG. 5 and FIG. 6 show the assembly 102 with the handle 106 in the second position, according to an example embodiment. FIG. 5 is a front perspective view of the assembly 102 with the handle 106 in the second position. FIG. 6 is a right side view of the assembly 102 with the handle 106 in the second position.

The handle 106 may be rotated from the first position shown in FIGS. 1-3, 4A, and 4B to the second position shown in FIGS. 5 and 6 using the latching mechanism 166. To rotate the handle 106, the holding part 120 of the handle 106 may be pushed in a direction 176 (shown by an arrow in FIG. 1 and FIG. 5) towards the resting part 144 of the handle 106.

When the handle 106 is in the second position, the first support part 138 and the second support part 202 may be disposed in a substantially horizontal position. Similarly, when the handle 106 is in the second position, the first connecting part 140 and the second connecting part 204 may be disposed in a substantially vertical position.

Upon rotation of the handle 106 into the second position, the self-winding hose reel 108 may be rotated from a position over the vertical shaft engine 114 to a position beside the vertical shaft engine 114. In an example embodiment, while the handle 106 is in the second position, the self-winding hose reel 108 may be disposed substantially below the vertical shaft engine 114. FIG. 6 shows the self-winding hose reel 108 disposed lower than the vertical shaft engine 114. Moreover, while the handle 106 is in the second position, the self-winding hose reel 108 may be disposed horizontally and parallel to the vertical shaft engine 114.

Referring to view A and view B in FIG. 1, view C in FIG. 4A, and view D in FIG. 5 illustrating the latching mechanism 166, the latching mechanism 166 may include a rotatable member 178, a latching plate 180, and a bolt 182 going through and connecting the latching plate 180 and the rotatable member 178. The rotatable member 178 may be connected to the first connecting part 140.

The rotatable member 178 may include a first plate 184 and a second plate 186 parallel each other. The rotatable member 178 may further include a connecting plate 188 that connects the first plate 184 to the second plate 186. In an example embodiment, the connecting plate 188 may be perpendicular to the first plate 184 and the second plate 186.

Each of the first plate 184 and the second plate 186 may have a slot 190. The latching plate 180 may have a first recess 192 and a second recess 194. When the assembly 102 is in the first position, the first recess 192 may be located in front of the slot 190 of the first plate 184.

The latching mechanism 166 may further include a latching pin 196. The latching pin 196 may be inserted into the slots 190. When the assembly 102 is in the first position, the latching pin 196 may be retained by a spring 198 in a first position contacting a first end (a bottom end in view A and view B in FIG. 1) of the slots 190. In this position, the latching pin 196 may engage with the first recess 192 of the latching plate 180.

The assembly 102 may have two latching mechanisms 166, where one latching mechanism 166 may be secured to the middle of a first lateral side of the platform 110 and another latching mechanism 166 may be secured to the middle of a second lateral side of the platform 110, as shown in view A and view B in FIG. 1, view D in FIG. 5, and FIG. 4B. The assembly 102 may have a pedal 402 secured to the rear side of the platform 110, as shown in view C in FIG. 4A and in FIG. 4B.

The spring 198 may be connected to the middle of the latching pin 196 to hold the latching pin 196 in the first recess 192 (shown in view D in FIG. 5) in order to provide the first position of the handle 106 or hold the latching pin 196 in the second recess 194 (shown in view D in FIG. 5) to provide the second position of the handle 106. As the rotatable member 178 is connected to the first connecting part 140 of the handle 106, pushing the handle 106 in the direction 176 may cause rotation of the rotatable member 178. The angle of rotation of the rotatable member 178 may be rotated 90 degrees. When changing the position of the handle 106, with rotation of the handle 106, the edge profile of the latching plate 180 forces the spring-loaded latching pin 196 to slide to a second end (a top end in view A and view B in FIG. 1) of the slot 190 to move from the first recess 192 or the second recess 194 and skid over the edge of the latching plate 180.

FIGS. 4A and 4B illustrate the structure of the pedal 402. A pedal retention spring 404 may be placed on the handle locking pin 414 between the bracket 412 and a split pin 416. There may be a hole provided in the pipe (i.e., the second connecting part 204) with which the spring-loaded handle locking pin 414 engages, going through a hole in the platform 110.

The pedal 402 may be configured to secure the handle 106 when the handle 106 is in the first position, so the user can tilt the handle 106 to maneuver the assembly 102. When the handle 106 is unfolded from the second position to the first position, the pipe (i.e., the second connecting part 204) pushes the handle locking pin 414 to retract and then to engage with the hole in the pipe (i.e., the second connecting part 204) to secure the handle 106.

The pedal may be activated at the same time when pushing the handle 106 in the direction 176. Specifically, the pedal 402 may be pressed by the foot of the user.

As shown in view D in FIG. 5, after the rotatable member 178 is rotated, the slot 190 may be located in front of the second recess 194. Accordingly, the latching pin 196 located in the slot 190 may be moved into the second recess 194. The spring 198 may cause movement of the latching pin 196 towards the first end (a right end in view D in FIG. 5) of the slot 190. In this position, the latching pin 196 extending through the slot 190 may engage with the second recess 194 of the latching plate 180. No further movement of the latching mechanism 166 is possible until unfolding the handle 106 into the first position. The engagement of the latching pin 196 with the second recess 194 may cause latching of the handle 106 in the second position.

Referring again to FIG. 4A, view C further shows a pedal retention spring 404 configured to return the pedal 402 into the initial position. The initial position of the pedal 402 when the pedal 402 is elevated over the platform 110 is shown in view C of FIG. 4A. The pedal 402 may be indirectly connected to the pedal retention spring 404 via a tapered plate 406 connected to the pedal 402, a first connecting plate 408 connected to the tapered plate 406, a holding member 410 connected to the first connecting plate 408, and a handle locking pin 414 connected to the holding member 410. The pedal retention spring 404 may be secured on the handle locking pin 414 by a split pin 416. Pressing the pedal 402 may cause lateral movement of the handle locking pin 414 with the pedal retention spring 404 placed on the handle locking pin 414. A bracket 412 may be disposed on the handle locking pin 414 and secured to the platform 110. The pedal retention spring 404 may be located in the bracket 412. As the bracket 412 stays in place during the lateral movement of the handle locking pin 414, movement of the handle locking pin 414 may cause compressing of the pedal retention spring 404. When the force is no longer applied to the pedal 402 by the foot, the pedal retention spring 404 is uncompressed to its initial state. The uncompressing of the pedal retention spring 404 causes movement of the holding member 410 in the opposite direction, along with movement of the first connecting plate 408, tapered plate 406, and pedal 402 to an initial inactivated state.

As shown in FIG. 5 and FIG. 6, the self-winding hose reel 108 may have a water hose 502. The water hose 502 may be extended from the self-winding hose reel 108 in the direction outwards from a front side of the assembly 102, as shown by an arrow 504.

The self-winding hose reel 108 may further have a housing including a front housing part 506 and a rear housing part 508 connected together. The housing may enclose the water hose 502. The housing may further have a fastener 510 configured to secure an end 512 of the water hose 502 of the self-winding hose reel 108 to the housing.

FIGS. 1-6 show the first side pipe 116 that is symmetrical and parallel to the second side pipe 118. In some example embodiments, the portions of the first side pipe 116 and second side pipe 118 may be symmetrical to each other with respect to a vertical symmetry plane, but may be not parallel to each other. For example, the first inclined part 122 and the second inclined part 124 may be not parallel, but may be directed towards each other and form sides of an isosceles trapezoid. Similarly, the third inclined part 130 and the fourth inclined part 132 may be symmetrical to each other with respect to a vertical symmetry plane, but may be not parallel to each other. For example, the third inclined part 130 and the fourth inclined part 132 may be not parallel, but may be inclined towards each other and form sides of an isosceles trapezoid. Similarly, the first support part 138 and the second support part 202 may be symmetrical to each other with respect to a vertical symmetry plane, but may be not parallel to each other. For example, the first support part 138 and the second support part 202 may be not parallel, but may be inclined towards each other and form sides of an isosceles trapezoid. Similarly, the fifth inclined part 148 and the sixth inclined part 150 may be symmetrical to each other with respect to a vertical symmetry plane, but may be not parallel to each other. For example, the fifth inclined part 148 and the sixth inclined part 150 may be not parallel, but may be inclined towards each other and form sides of an isosceles trapezoid.

In some example embodiments, instead of having two side tubes, namely the first side pipe 116 and the second side pipe 118, the handle 106 may have one tube. The tube may connect by its upper end to the holding part 120 and may connect by its lower end to the platform 110 or to the bottom support 142.

FIGS. 7-11 illustrate an assembly 702 for high-pressure cleaning in form of a pressure washer powered by a horizontal shaft engine, according to an example embodiment. The assembly 702 is a horizontal type handle assembly 702 having a handle extending horizontally.

Figure 7:
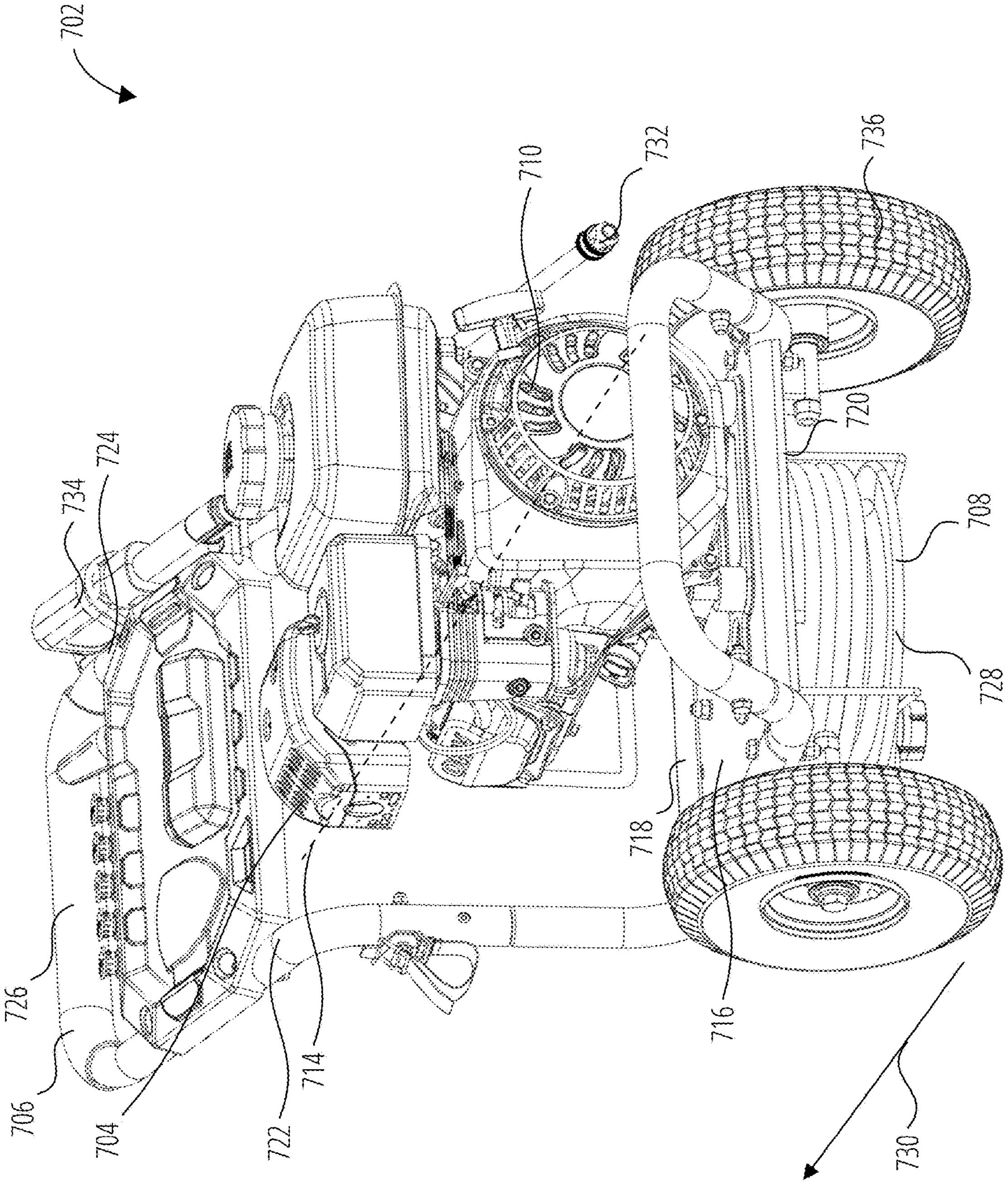
FIG. 7 is a front perspective view of an assembly for high-pressure cleaning powered by a horizontal shaft engine, according to an example embodiment.
Figure 8:
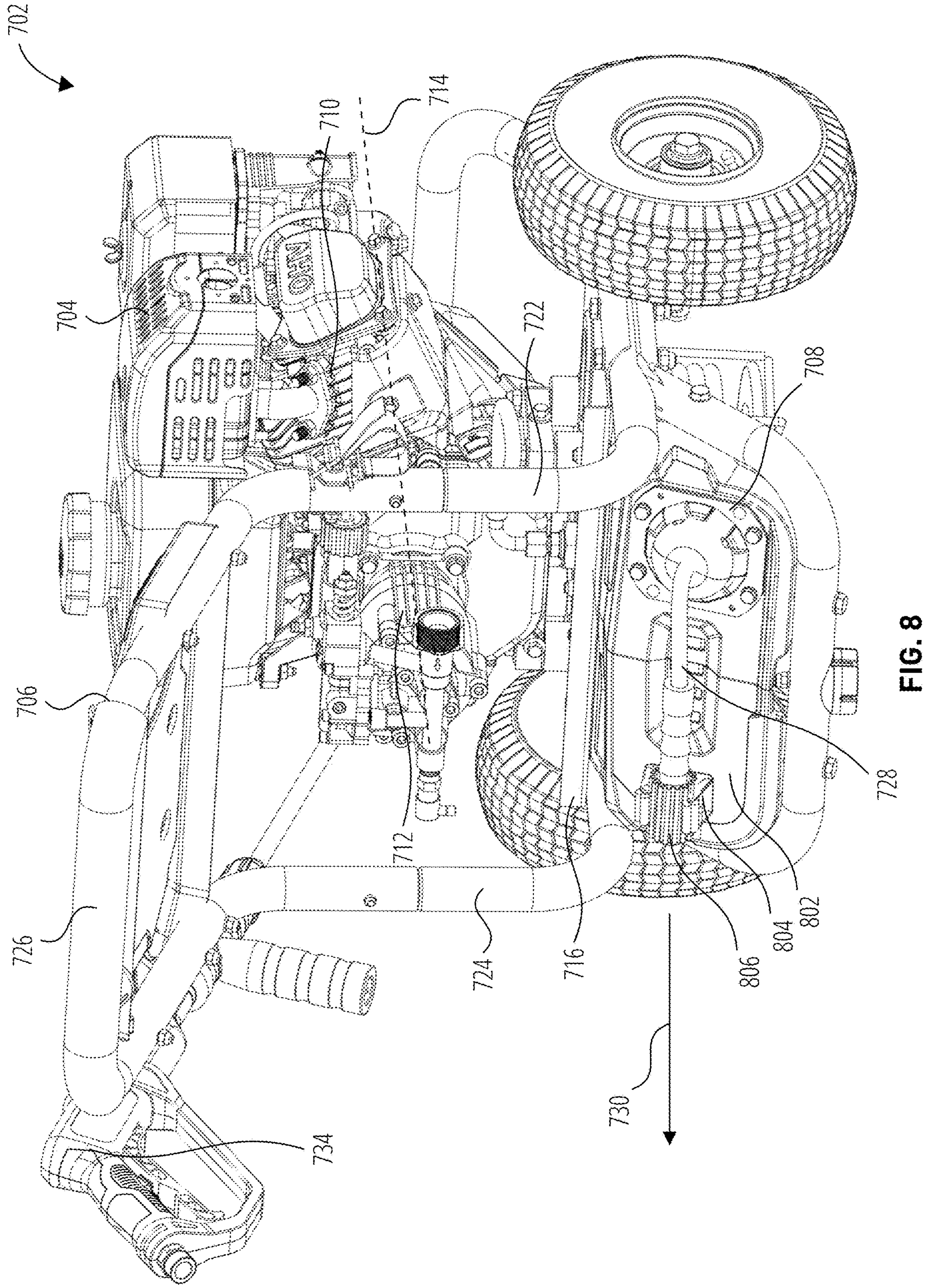
FIG. 8 is a rear perspective view of the assembly for high-pressure cleaning, according to an example embodiment.
Figure 9:
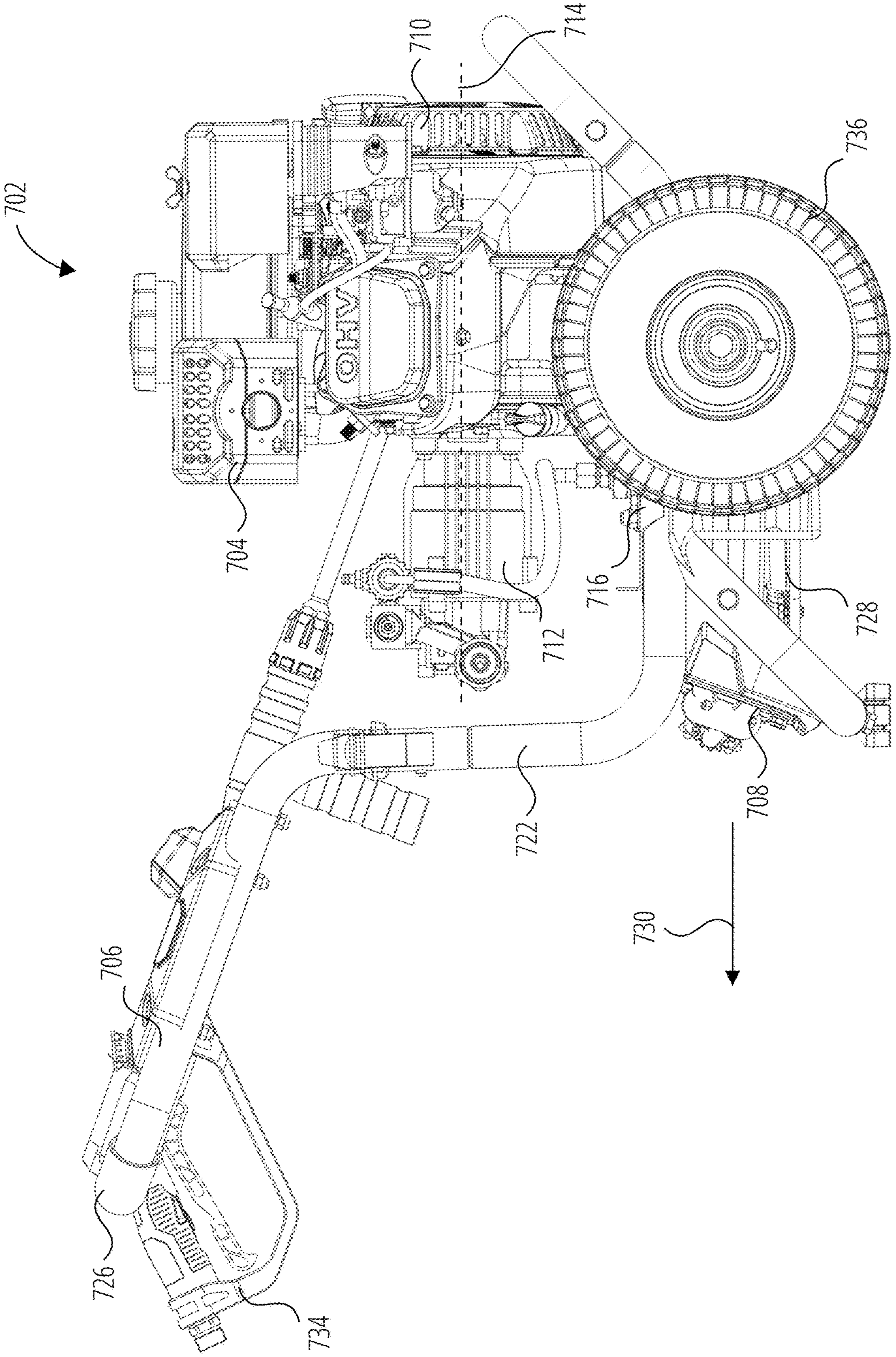
FIG. 9 is a left side view of the assembly for high-pressure cleaning, according to an example embodiment.
Figure 10:
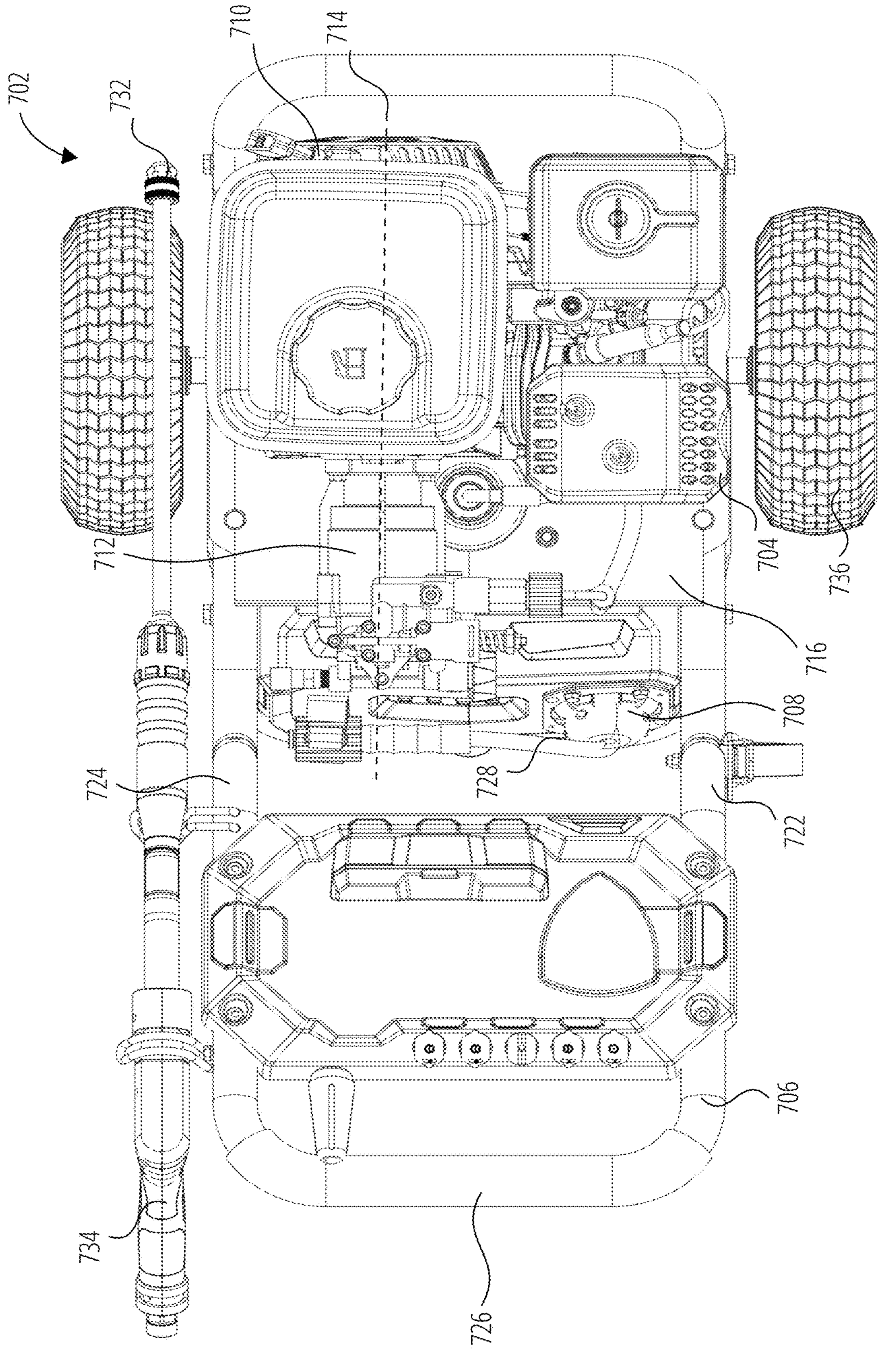
FIG. 10 is an upper view of the assembly for high-pressure cleaning, according to an example embodiment.
Figure 11:
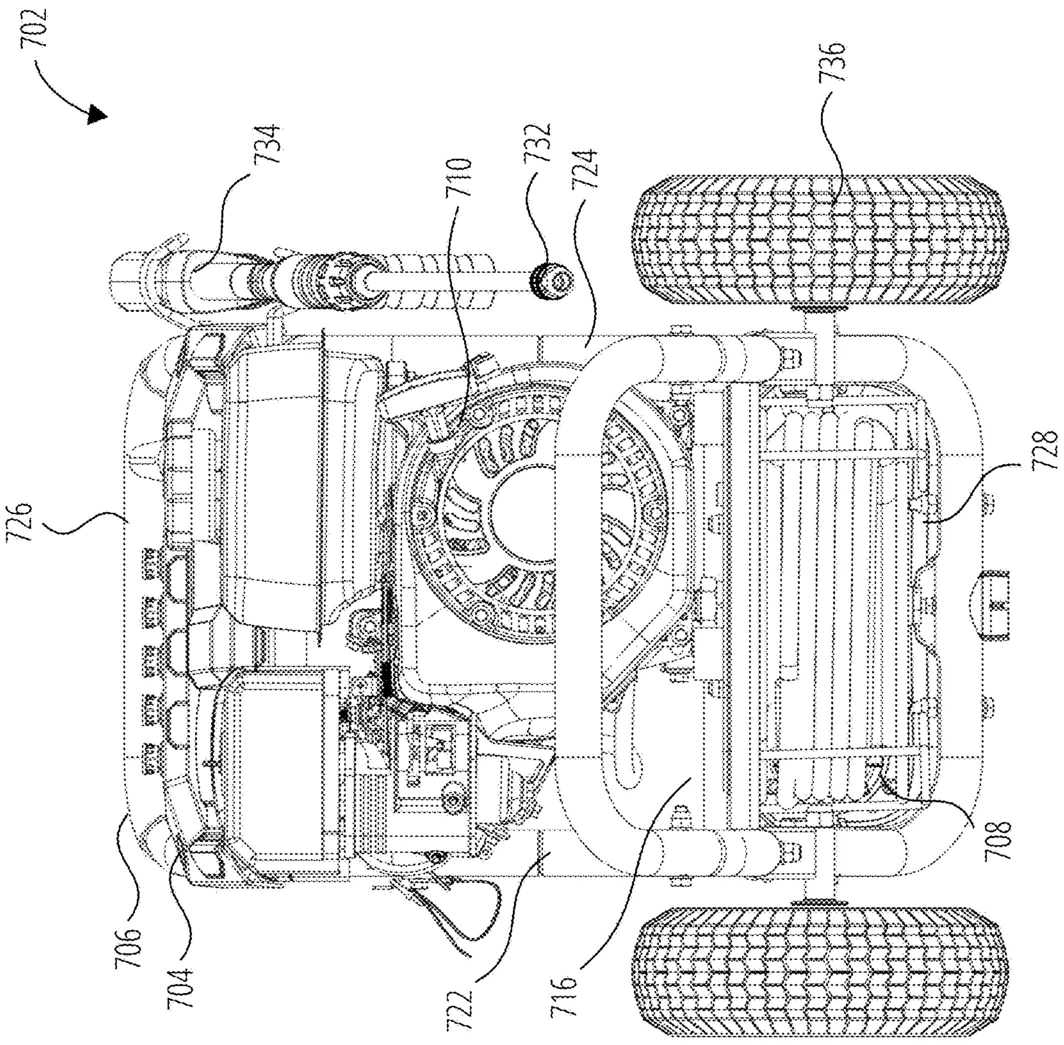
FIG. 11 is a front view of the assembly for high-pressure cleaning, according to an example embodiment.

FIG. 7 is a front perspective view of the assembly 702, according to an example embodiment. FIG. 8 is a rear perspective view of the assembly 702, according to an example embodiment. FIG. 9 is a left side view of the assembly 702, according to an example embodiment. FIG. 10 is an upper view of the assembly 702, according to an example embodiment. FIG. 11 is a front view of the assembly 702, according to an example embodiment.

Referring to FIGS. 7-11, the assembly 702 may include a pressure washer 704, a handle 706 connected to the pressure washer 704, and a self-winding hose reel 708. The pressure washer 704 may be powered by a horizontal shaft engine 710. Therefore, the assembly 702 is a horizontal shaft engine powered pressure washer with the self-winding hose reel 708. The pressure washer 704 may include a water pump 712 connected to the horizontal shaft engine 710. The horizontal shaft engine 710 and the water pump 712 may be located along the same horizontal axis 714, which is an axis of a shaft of the horizontal shaft engine 710. The pressure washer 704 may further include a platform 716. The horizontal shaft engine 710 may be mounted on the platform 716. In an example embodiment, the water pump 712 may be indirectly mounted onto the platform 716 by being connected to the horizontal shaft engine 710, but may not touch the platform 716 directly.

In an example embodiment, on the pressure washer 704 powered by the horizontal shaft engine 710, the horizontal shaft engine 710 can be mounted to the platform 716 using four bolts and nuts, then the water pump 712 can be slid on the shaft of the horizontal shaft engine 710 and secured to the horizontal shaft engine 710 using another four bolts and nuts. In some example embodiments, the water pump 712 may be installed on the horizontal shaft engine 710 first, and then the combination of the horizontal shaft engine 710 and the water pump 712 may be mounted on the platform 716.

The handle 706 may be connected to the platform 716. The handle 706 may be configured to be used for maneuvering the assembly 702. The pressure washer 704 may include one of the following: an electrically powered high-pressure washer, a gasoline engine powered high-pressure washer, and any other type of pressure washer.

The self-winding hose reel 708 may be disposed below the horizontal shaft engine 710. In an example embodiment, the horizontal shaft engine 710 may be located on a first surface 718 (a surface faced upwards) of the platform 716 and the self-winding hose reel 708 may be connected to a second surface 720 (a surface faced downwards) of the platform 716 and below the horizontal shaft engine 710. The water pump 712 may be arranged over the first surface 718 of the platform 716. The self-winding hose reel 708 arranged on the second surface 720 of the platform 716 may be located below the water pump 712.

The handle 106 may have a curvilinear form and include several parts. In an example embodiment, the handle 106 may include a first side pipe 722 and a second side pipe 724. In some example embodiments, the first side pipe 722 may be parallel to the second side pipe 724. The first side pipe 722 may be secured to a first side of the platform 716 and second side pipe 724 may be secured to a second side of the platform 716.

The handle 106 may further include a holding part 726. The holding part 726 may be used by a user of the assembly 702 for holding the handle 706 by hands when maneuvering the assembly 702 by the user. The holding part 726 may connect the first side pipe 722 and the second side pipe 724 to each other.

The self-winding hose reel 708 may have a water hose 728. The water hose 728 may be extended from the self-winding hose reel 708 in the direction outwards from a rear side of the assembly 702, as shown by an arrow 730.

As shown in FIG. 8, the assembly 702 may further have a front plate 802 connected to the platform 716. The front plate 802 may cover the self-winding hose reel 708. The water hose 728 of the self-winding hose reel 708 may pass through an opening in the front plate 802. The assembly 702 may further include a fastener 804 mounted to the front plate 802 of the platform 716. The fastener 804 may be configured to secure an end 806 of the water hose 728 of the self-winding hose reel 708 to the platform 716.

The assembly 702 may have other components required for the operation of the assembly 702, such as a spray nozzle 732 configured to control the shape and intensity of the water stream, a trigger gun 734 for activating the flow of pressurized water from the water pump 712 to the spray nozzle 732, wheels 736 for easy maneuverability and transportation, and so forth.

Figure 12A:
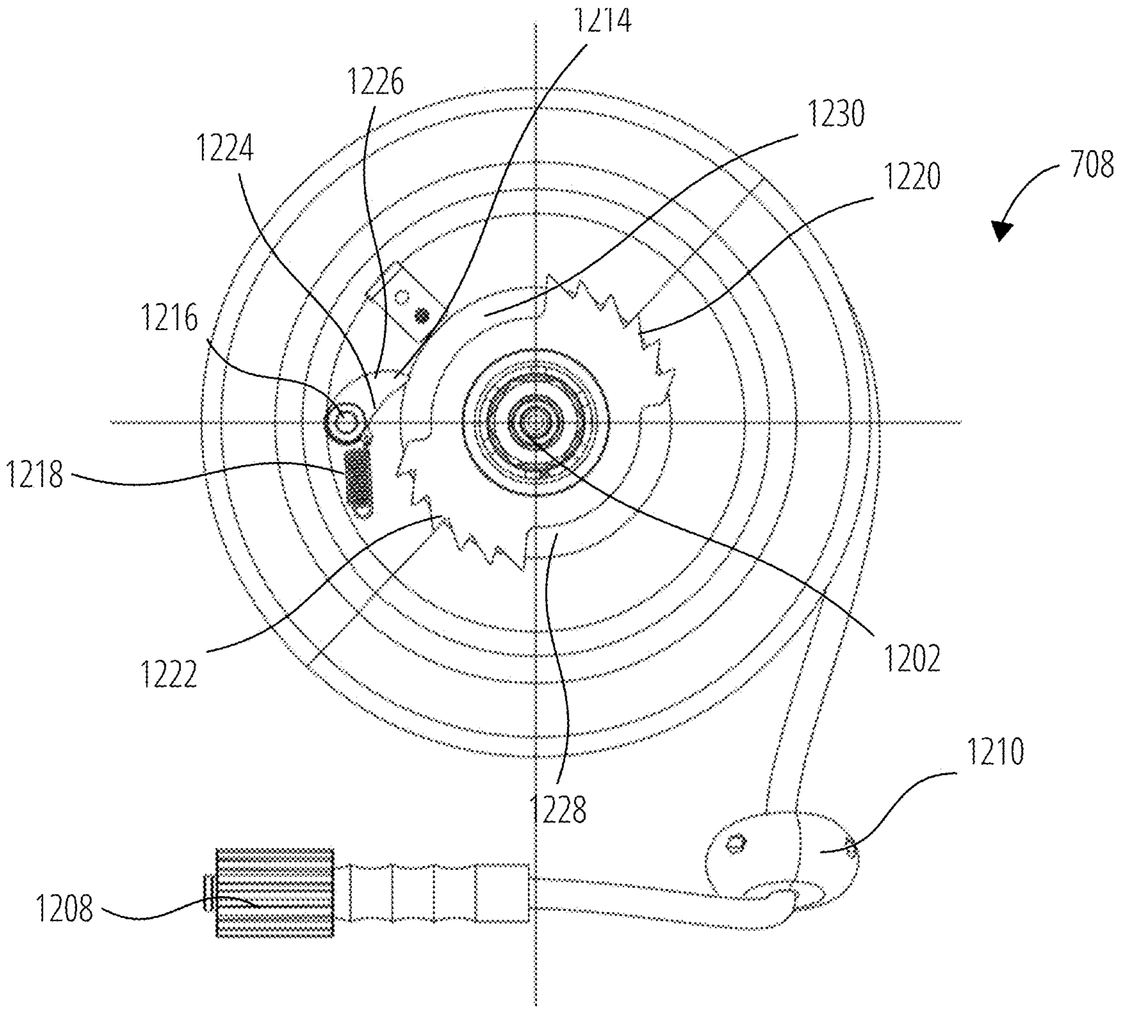
FIG. 12A is a top view of a self-winding hose reel, according to an example embodiment.
Figure 12B:
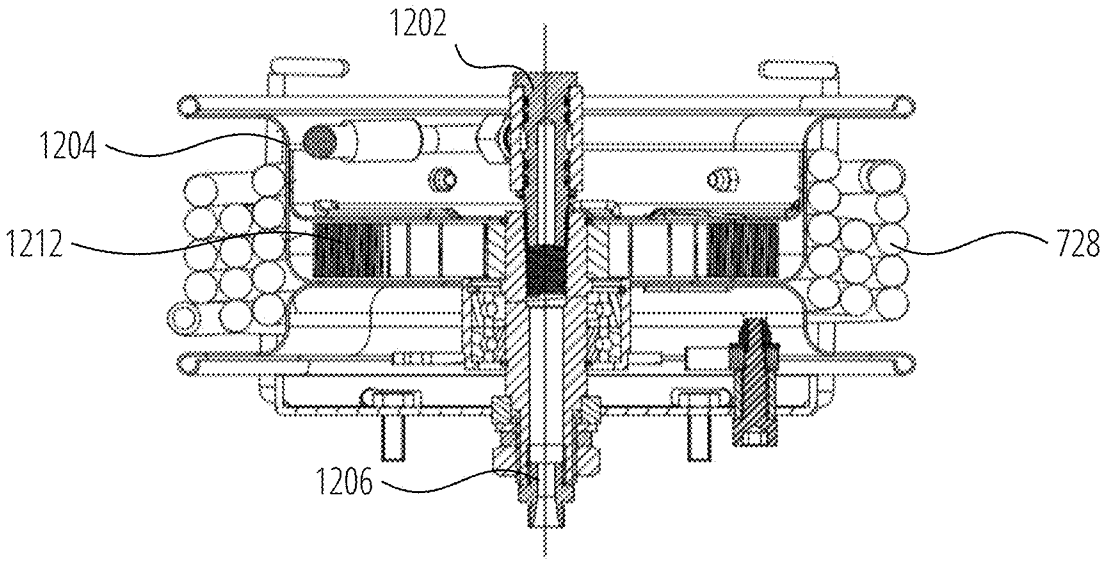
FIG. 12B is a front cross-sectional view of the self-winding hose reel, according to an example embodiment.

FIG. 12A and FIG. 12B illustrate a self-winding hose reel 708, according to an example embodiment. The self-winding hose reel 108 may be similar to the self-winding hose reel 708. FIG. 12A is a top view of the self-winding hose reel 708. FIG. 12B is a front cross-sectional view of the self-winding hose reel 708.

The self-winding hose reel 708 may include a sleeve shaft 1202 and a drum 1204 put on the sleeve shaft 1202. The self-winding hose reel 708 may further include a water intake 1206 and a water outlet 1208 with a stop block 1210. The self-winding hose reel 708 may further include a water hose 728 wrapped on the drum 1204. The stop block 1210 may be arranged around the water hose 728 to prevent the water hose 728 from being retracted completely into the self-winding hose reel 708. The self-winding hose reel 708 may further include a first spring 1212 placed around the sleeve shaft 1202 inside the drum 1204. In an example embodiment, the first spring 1212 may include a coil spring, a volute spring, and any other applicable type of spring. When pulling out the water hose 728, the drum 1204 rotates and compresses the first spring 1212 around the sleeve shaft 1202, so that the compressed first spring 1212 can rotate the drum 1204 to automatically retract the water hose 728.

The self-winding hose reel 708 may further have a pawl 1214. The pawl 1214 may be mounted on a pin 1216. The pawl 1214 may be pre-loaded by a second spring 1218 at the end, so that the spring-loaded pawl 1214 can swivel in a predetermined range. A first teethed edge 1220 and a second teethed edge 1222 may be arranged on the drum 1204 for engagement with the pawl 1214.

When pulling out the water hose 728, the drum 1204 rotates clockwise and the first spring 1212 is compressed. The pawl 1214 may include a pawl face portion 1224 and a pawl back portion 1226. The pawl 1214 skids over the first teethed edge 1220 and the second teethed edge 1222 of the drum 1204 smoothly. When stopping pulling out the water hose 728, the drum 1204 rotates counterclockwise slightly by the force of the compressed first spring 1212 until the pawl 1214 engages, by the pawl face portion 1224, one tooth on the first teethed edge 1220 or the second teethed edge 1222 to block the rotation.

To activate the automatic retraction of the water hose 728, the water hose 728 may be further pulled out for a predetermined distance until the pawl 1214 reaches either a first teeth-free area 1228 or a second teeth-free area 1230.

During the counterclockwise rotation of the drum 1204, the pawl back portion 1226 skids over the first teethed edge 1220 and the second teethed edge 1222, which does not block the rotation of the drum 1204, and the compressed first spring 1212 retracts the water hose 728 automatically.

Figure 13:
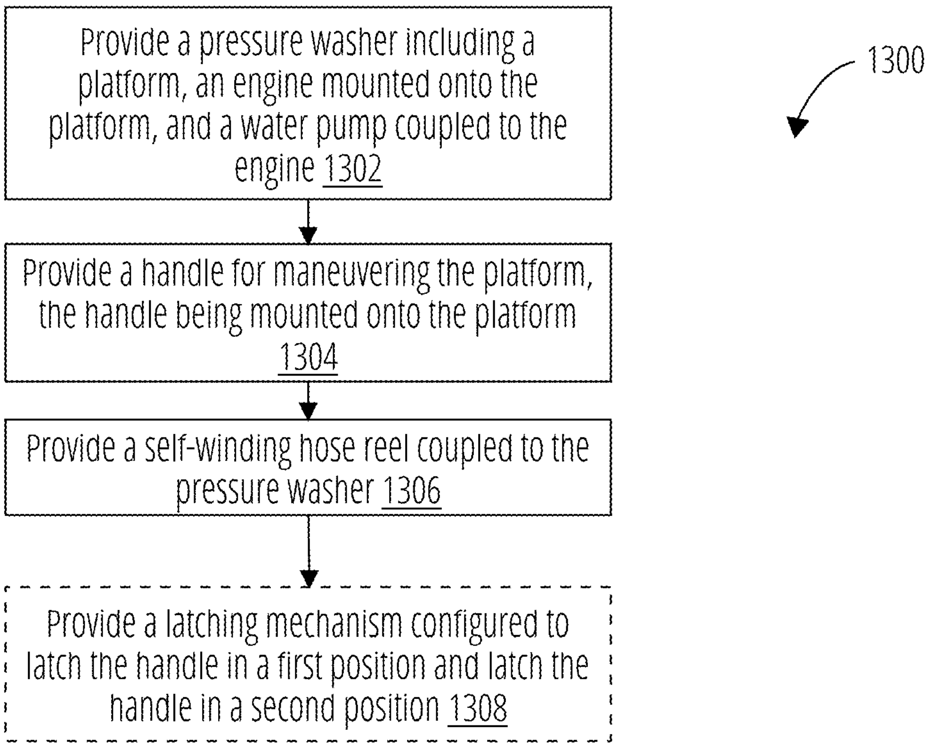
FIG. 13 illustrates a method for manufacturing an assembly for high-pressure cleaning, according to an example embodiment.

FIG. 13 is a flow chart of a method 1300 for manufacturing an assembly for high-pressure cleaning, according to an example embodiment. In some embodiments, the operations of the method 1300 may be combined, performed in parallel, or performed in a different order. The method 1300 may also include additional or fewer operations than those illustrated.

In block 1302, the method 1300 may commence with providing a pressure washer. The pressure washer may include a platform, an engine mounted onto the platform, and a water pump coupled to the engine. In block 1304, the method 1300 may include providing a handle for maneuvering the platform. The handle may be mounted onto the platform.

In block 1306, the method 1300 may proceed with providing a self-winding hose reel coupled to the pressure washer. In an example embodiment, the self-winding hose reel may be mounted on the handle. The handle may be configured to rotate with respect to the engine from a first position to a second position. While the handle is in the first position, the self-winding hose reel may be disposed above the engine. While the handle is in the second position, the self-winding hose reel may be disposed below the engine.

In an example embodiment, while the handle is in the first position, the self-winding hose reel may be disposed vertically with respect to the engine. While the handle is in the second position, the self-winding hose reel may be disposed parallel to the engine.

In an example embodiment, the handle may include a first side pipe and a second side pipe. The second side pipe may be parallel to the first side pipe. The self-winding hose reel may be secured between the first side pipe and the second side pipe.

The method 1300 may further optionally include providing, in block 1308, a latching mechanism configured to latch the handle in the first position and latch the handle in the second position.

In an example embodiment, the engine may be arranged over the first surface of the platform. The self-winding hose reel may be arranged on the second surface of the platform and below the engine.

The method 1300 may further include providing a fastener mounted onto the platform. The fastener may be configured to secure an end of the self-winding hose reel to the platform.

Thus, assemblies for high-pressure cleaning and methods for manufacturing assemblies for high-pressure cleaning have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. An assembly for high-pressure cleaning, the assembly comprising:
- a pressure washer including:
  - a platform;
  - an engine mounted onto the platform; and
  - a water pump coupled to the engine;
- a handle for maneuvering the platform, the handle being mounted onto the platform; and
- a self-winding hose reel coupled to the pressure washer, wherein:
  - the self-winding hose reel is mounted on the handle;
  - the handle is configured to be rotated with respect to the engine from a first position to a second position; and
  - while the handle is in the second position, the self-winding hose reel is disposed below the engine.

2. The assembly of claim 1, wherein, while the handle is in the first position, the self-winding hose reel is disposed above the engine.

3. The assembly of claim 1, wherein, while the handle is in the first position, the self-winding hose reel is disposed vertically with respect to the engine.

4. The assembly of claim 1, wherein, while the handle is in the second position, the self-winding hose reel is disposed parallel to the engine.

5. The assembly of claim 1, wherein:
- the handle includes a first side pipe and a second side pipe, the second side pipe being parallel to the first side pipe; and
- the self-winding hose reel is secured between the first side pipe and the second side pipe.

6. The assembly of claim 1, further comprising a latching mechanism configured to latch the handle in the first position and latch the handle in the second position.

7. The assembly of claim 1, wherein the engine includes one of the following: an electric engine and a gasoline engine.

8. A method for manufacturing an assembly for high-pressure cleaning, the assembly comprising:
- providing a pressure washer including:
  - a platform;
  - an engine mounted onto the platform; and
  - a water pump coupled to the engine;
- providing a handle for maneuvering the platform, the handle being mounted onto the platform; and
- providing a self-winding hose reel coupled to the pressure washer, wherein:
  - the self-winding hose reel is mounted on the handle;
  - the handle is configured to be rotated with respect to the engine from a first position to a second position; and
  - while the handle is in the second position, the self-winding hose reel is disposed below the engine.

9. The method of claim 8, wherein, while the handle is in the first position, the self-winding hose reel is disposed above the engine.

10. The method of claim 8, wherein, while the handle is in the first position, the self-winding hose reel is disposed vertically with respect to the engine.

11. The method of claim 8, wherein, while the handle is in the second position, the self-winding hose reel is disposed parallel to the engine.

12. The method of claim 8, wherein:
- the handle includes a first side pipe and a second side pipe, the second side pipe being parallel to the first side pipe; and
- the self-winding hose reel is secured between the first side pipe and the second side pipe.

13. The method of claim 8, further comprising providing a latching mechanism configured to latch the handle in the first position and latch the handle in the second position.

14. The method of claim 8, wherein the engine includes one of the following: an electric engine and a gasoline engine.

* * * * *